(12) United States Patent
Rohden et al.

(10) Patent No.: US 8,294,291 B2
(45) Date of Patent: Oct. 23, 2012

(54) TURBINE FOR A HYDROELECTRIC POWER STATION

(75) Inventors: Rolf Rohden, Aurich (DE); Dirk Holtkamp, Aurich (DE)

(73) Assignee: Aloys Wobben, Aurich (DE)

( * ) Notice: Subject to any disclaimer, the term of this patent is extended or adjusted under 35 U.S.C. 154(b) by 601 days.

(21) Appl. No.: 11/988,520

(22) PCT Filed: Jul. 10, 2006

(86) PCT No.: PCT/EP2006/006719
§ 371 (c)(1),
(2), (4) Date: Mar. 16, 2009

(87) PCT Pub. No.: WO2007/006524
PCT Pub. Date: Jan. 18, 2007

(65) Prior Publication Data
US 2009/0214343 A1    Aug. 27, 2009

(30) Foreign Application Priority Data
Jul. 8, 2005    (DE) .......................... 10 2005 032 381

(51) Int. Cl.
*F03B 13/00* (2006.01)
(52) U.S. Cl. ....................................................... 290/54
(58) Field of Classification Search .............. 290/43, 290/52, 54
See application file for complete search history.

(56) References Cited

U.S. PATENT DOCUMENTS

| | | | |
|---|---|---|---|
| 3,353,028 A | 11/1967 | Braikevitch et al. | |
| 3,980,894 A * | 9/1976 | Vary et al. | 290/54 |
| 4,258,271 A * | 3/1981 | Chappell et al. | 290/54 |
| 4,868,408 A * | 9/1989 | Hesh | 290/52 |
| 6,011,334 A * | 1/2000 | Roland | 290/54 |
| 6,042,333 A | 3/2000 | Day | |
| 6,320,273 B1 * | 11/2001 | Nemec | 290/55 |
| 6,806,586 B2 * | 10/2004 | Wobben | 290/54 |
| 6,849,965 B2 * | 2/2005 | Le Nabour et al. | 290/55 |
| 7,102,249 B2 * | 9/2006 | Wobben | 290/54 |
| 7,471,009 B2 * | 12/2008 | Davis et al. | 290/54 |
| 2003/0178855 A1 * | 9/2003 | Li | 290/43 |
| 2004/0041409 A1 * | 3/2004 | Gabrys | 290/55 |
| 2005/0001432 A1 | 1/2005 | Drentham Susman et al. | |
| 2006/0043738 A1 * | 3/2006 | Roos | 290/54 |

FOREIGN PATENT DOCUMENTS

AT    002546 U1    11/1998
(Continued)

OTHER PUBLICATIONS

International Search Report dated Nov. 11, 2006, 10 pages.

*Primary Examiner* — Tho D Ta
(74) *Attorney, Agent, or Firm* — Seed IP Law Group PLLC

(57) ABSTRACT

There is provided a turbine for a hydroelectric power installation. The turbine has a rotor with a plurality of blades, with the rotor being arranged in front of a guide apparatus (in the flow direction). The pitch angle of the blades of the rotor is adapted to be variable. As the rotor is arranged in front of the guide apparatus (in the flow direction) the flow meets the rotor first and only thereafter meets the guide apparatus, thus affording optimum flow conditions for the rotor.

9 Claims, 4 Drawing Sheets

FOREIGN PATENT DOCUMENTS

| | | |
|---|---|---|
| CH | 332959 | 9/1958 |
| DE | 884930 | 7/1953 |
| DE | 3429288 A1 | 4/1986 |
| EP | 0622543 A1 | 11/1994 |
| FR | 723297 A | 4/1932 |
| FR | 1121516 A | 8/1956 |
| FR | 1137394 | 5/1957 |
| JP | 371110 | 1/1937 |
| JP | 54106741 A | 8/1979 |
| JP | 57013999 A | 1/1982 |
| JP | 61200469 U | 12/1986 |
| JP | S62225775 A | 10/1987 |
| JP | 63166680 U | 10/1988 |
| JP | 4137271 U | 12/1992 |
| JP | 06-101694 A | 4/1994 |
| JP | 658174 U | 8/1994 |
| JP | 07233797 A | 9/1995 |
| JP | 10115278 A | 5/1998 |
| JP | 10-513522 A | 12/1998 |
| JP | 2000240552 A | 9/2000 |
| JP | 2001221141 A | 8/2001 |
| JP | 2002155846 A | 5/2002 |
| WO | 00/42318 A1 | 7/2000 |
| WO | 00/50768 A1 | 8/2000 |
| WO | 01/14739 A1 | 3/2001 |
| WO | 03/056169 A1 | 7/2003 |

\* cited by examiner

TURBINE FOR A HYDROELECTRIC POWER STATION

BACKGROUND

1. Technical Field

The present invention concerns a turbine for a hydroelectric power station for generating electrical energy as well as a hydroelectric power station having a corresponding turbine.

2. Description of the Related Art

Hydroelectric power stations or hydroelectric power installations with turbines are known, which are divided substantially into three levels. The first level generally represents a support apparatus with which the turbine is held in its position in a passage. There is further provided a guide apparatus which is usually arranged in front of the rotor. Finally the rotor itself is arranged with the blades therebehind. That means that a flow in respect of a turbine of that kind is influenced at those three levels or locations.

'Wasserkraftanlagen' ['Hydroelectric power installations'], 3rd edition, Springer Verlag 2003 by Jürgen Giesecke and Emil Mosonyi shows a number of hydroelectric power installations. Shown here for example is a Kaplan tube turbine. That turbine has an inlet shaft, the turbine and a suction hose, which are disposed very substantially in a line and are horizontal or slightly inclined relative to the horizontal. That has the advantage of avoiding a plurality of changes in the direction of flow, to the favor of a higher energy output. The turbine has support blades, guide blades and a rotor arranged therebehind, with corresponding blades.

Straight-flow turbine units are also known, wherein a generator is arranged concentrically outside the flow tube so that the generator is not disposed in the interior of the housing vessel. The rotor comprises a hub, rotor blades and a rotor ring, these being typically produced in the form of a welded structure to form a unit. A support cross arrangement is arranged in the flow direction upstream of the guide blades and the rotor with the rotor blades.

The guide apparatus arranged in front of the rotor is used by rotation of the guide blades or support blades to shut down the turbine by the blades being so set that they bear against each other and thus close the passage.

At this juncture attention is directed generally as state of the art to the following publications: DE 34 29 288 A1, DE 884 930 C, EP 0 622 543 A1, CH 332 959 and US No. 2005/0001432 A1.

BRIEF SUMMARY

Therefore one object of the present invention is to provide a turbine and a hydroelectric power installation having a corresponding turbine which is of a simplified structure and affords greater power output.

That object is attained by a turbine as set forth in claim 1 and by a hydroelectric power station as set forth in claim 6.

There is thus provided a turbine for a hydroelectric power installation. The turbine has a rotor with a plurality of blades, wherein the rotor is arranged in front of a guide apparatus, in the flow direction. The pitch angle of the blades of the rotor is adapted to be variable.

By virtue of the fact that the rotor is arranged in front of the guide apparatus, in the flow direction, the flow encounters the rotor first and only thereafter encounters the guide apparatus, thus affording optimum flow conditions for the rotor.

The fact that no separate support apparatus is provided means that the losses of a flow around the support apparatus are completely eliminated, thereby affording an increased level of efficiency in comparison with the state of the art.

In accordance with an aspect of the present invention the rotor has a spherical hub for connecting the turbine blades to the rotor. The spherical configuration of the hub makes it possible to adjust the pitch angle of the turbine blades over a great extent.

In accordance with a further aspect of the present invention the turbine blades bear in positively locking relationship against the spherical hub so that it is possible to avoid disadvantageous flow conditions as the turbine blades join the hub.

In accordance with a further aspect of the invention the pitch angle of the turbine blades can be adjusted in an angle of −20° to 140° so that the rotor can be decelerated or accelerated if the pitch angle of the turbine blades is appropriately selected.

Further aspects of the present invention are subject-matter of the appendant claims.

BRIEF DESCRIPTION OF THE SEVERAL VIEWS OF THE DRAWINGS

The invention is described in greater detail hereinafter with reference to the drawings in which.

DETAILED DESCRIPTION

Figures 1A, 1B, 1C:
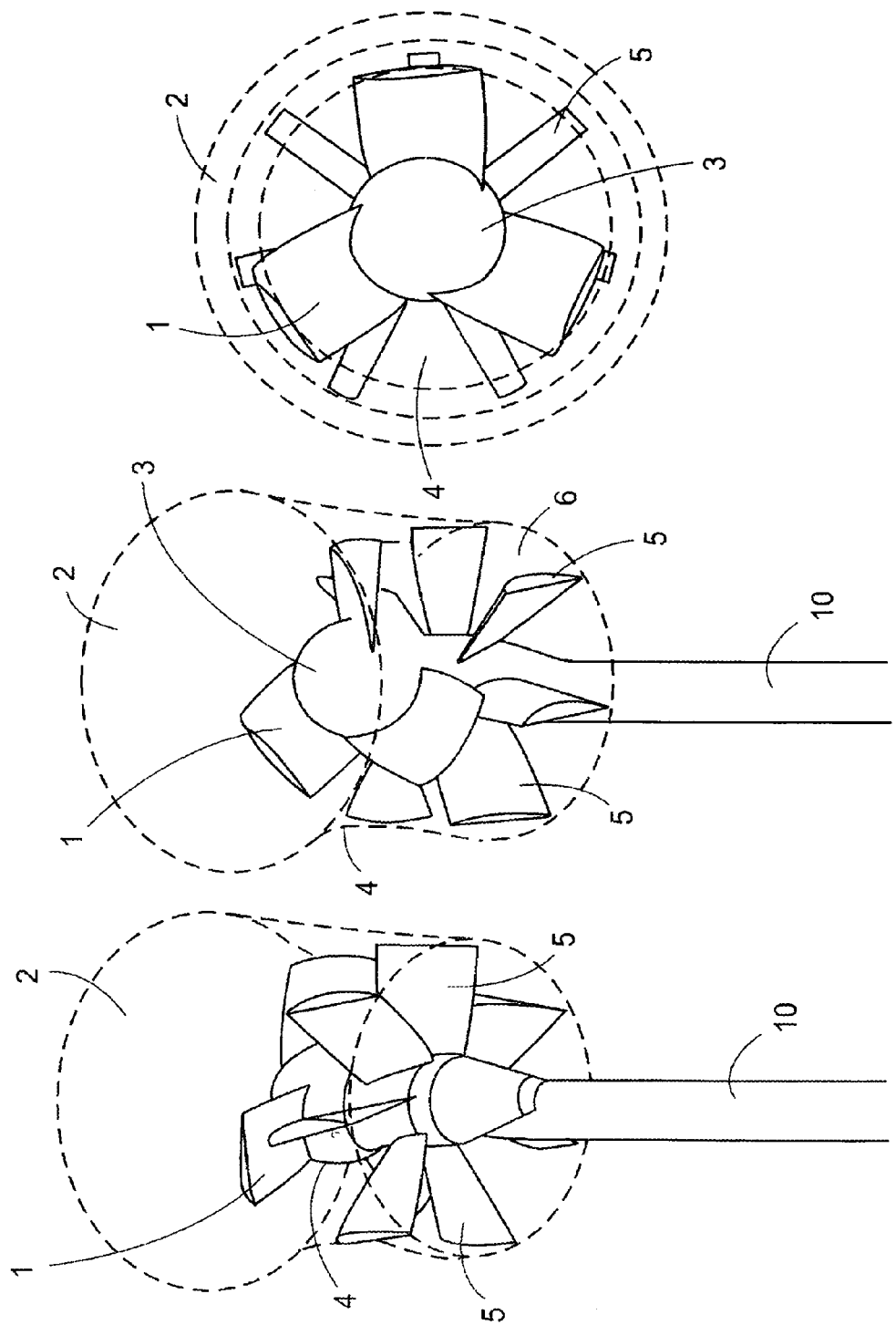
FIG. 1a shows a diagrammatic view of a turbine according to the first embodiment.
FIG. 1b shows a further diagrammatic view of a turbine according to the first embodiment.
FIG. 1c shows a front view of a turbine according to the first embodiment.

FIG. 1a shows a diagrammatic view of a turbine in accordance with a first embodiment. FIG. 1b shows a further view of the turbine as shown in FIG. 1a. FIG. 1c shows a front view of the turbines of FIGS. 1a and 1b. The turbine has a rotor 4 with turbine blades 1 which are connected to a hub 3 which is of a substantially spherical configuration. The rotor 4 with the turbine blades 1 is disposed in front of a guide apparatus 6 in the flow direction. The present turbine is thus an upstream rotor turbine. In other words, the guide apparatus 6 is behind the rotor 4 and at the same time supports the rotor in the passage 2 so that an additional support apparatus can be omitted. The guide apparatus 6 thus also has a mounting arrangement.

Accordingly the flow firstly meets the rotor 4 in an undisturbed condition so that a maximum amount of energy can be taken from the flow before the flow encounters the guide apparatus 6. In that respect the guide apparatus 6 is designed in such a way that an optimum discharge flow of the water is ensured by reducing swirl losses, thus preventing a build-up accumulation and a collapse in the level of efficiency that this entails.

The guide apparatus has support blades 5. In the first embodiment there are seven support blades 5. The support blades 5 are preferably not designed to be adjustable.

The blades 1 of the rotor 4 are variable in a range of −20° to 140°, preferably from −10° to 120°, so that pitch adjustment of the turbine blades 1 is possible. In that way the blades of the rotor can be displaced into any position without a gap being formed between the turbine blades 1 at their root and the rotor hub 3 as the turbine blades 1 bear in positively locking relationship against the hub by virtue of the spherical shape of the hub 3.

By adjustment of the blades 1 through 90° the blades are turned into what is referred to as the 'feathered position', that is to say the water flows past the blades and through the guide apparatus 6 without causing the rotor 4 to move. As a result water can flow away through the turbine passage even when the turbine is not in operation and the passage does not have to be shut off in order to decelerate and possibly stop the rotor.

Adjustability of the support blades is not required by virtue of the adjustment of the blades of the rotor 4 and by virtue of the fact that the rotor 4 can be stopped by virtue of the fact that the blades can be rotated into a feathered position.

Figure 2A:
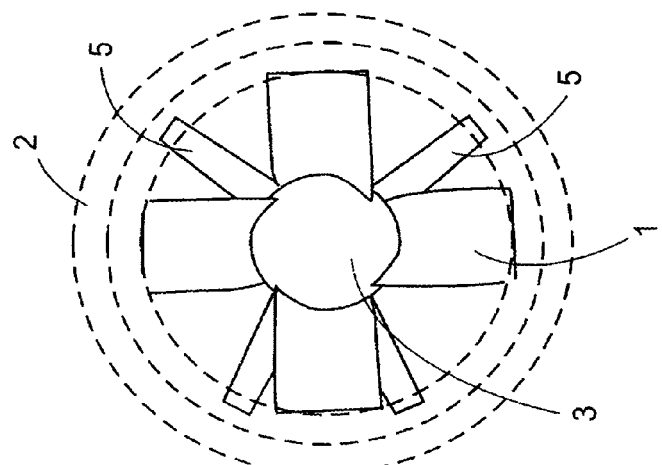
FIG. 2a shows a diagrammatic view of a turbine according to the second embodiment.
Figure 2B:
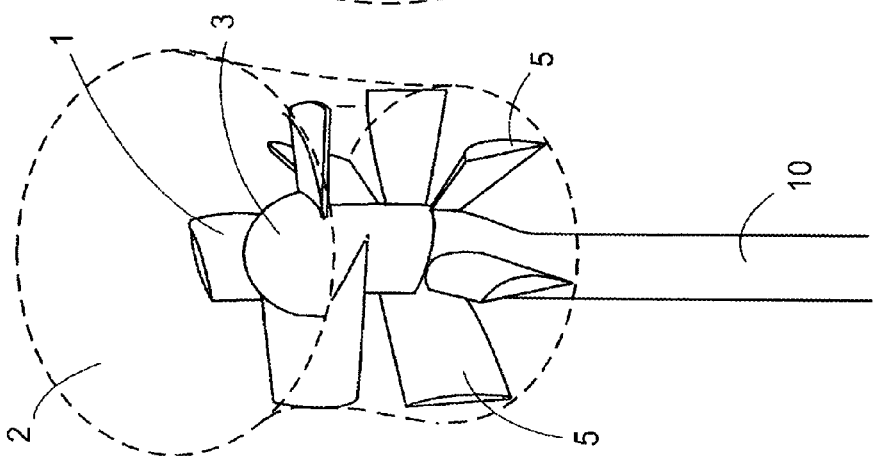
FIG. 2b shows a further diagrammatic view of a turbine according to the second embodiment.
Figure 2C:
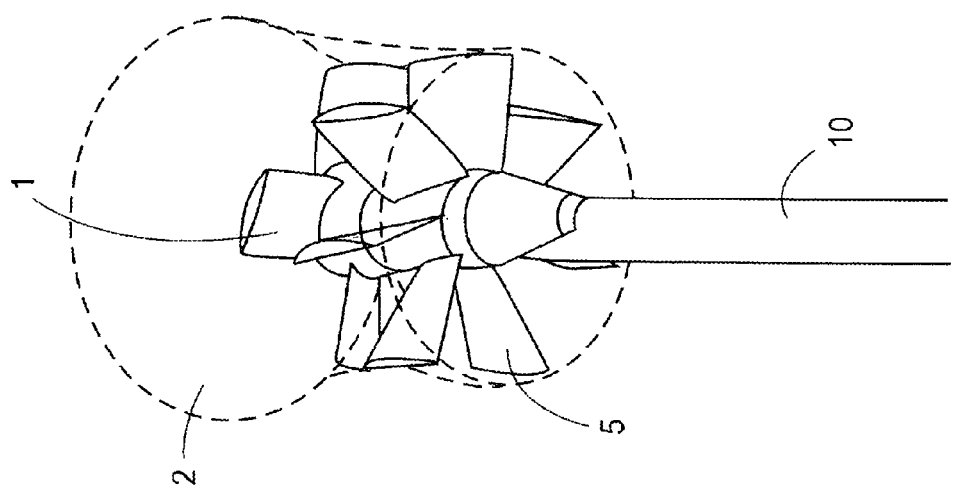
FIG. 2c shows a front view of a turbine according to the second embodiment.

FIGS. 2*a* to 2*c* show a turbine in accordance with the second embodiment. In this case the structure of the turbine of the second embodiment substantially corresponds to the structure of the turbine of the first embodiment. As in the first embodiment there are seven support blades 5 in the guide apparatus. As a departure from the first embodiment however there are four blades on the rotor.

Figure 3A:
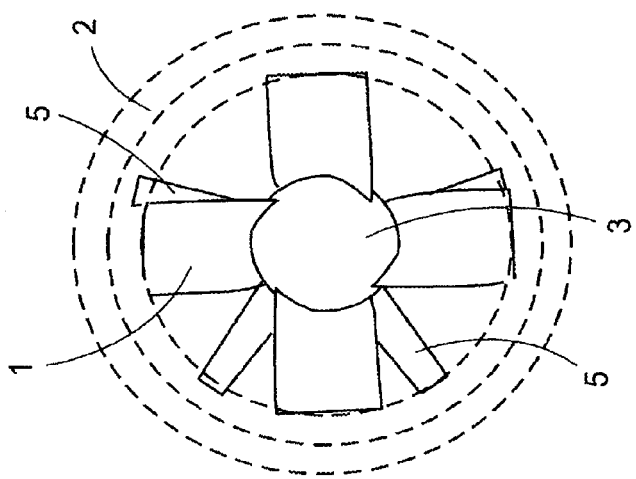
FIG. 3a shows a diagrammatic view of a turbine according to the third embodiment.
Figure 3B:
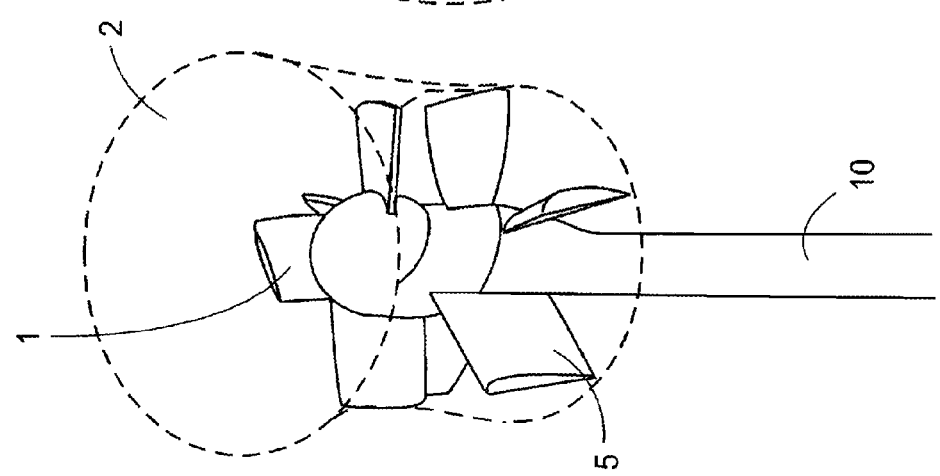
FIG. 3b shows a further diagrammatic view of a turbine according to the third embodiment.
Figure 3C:
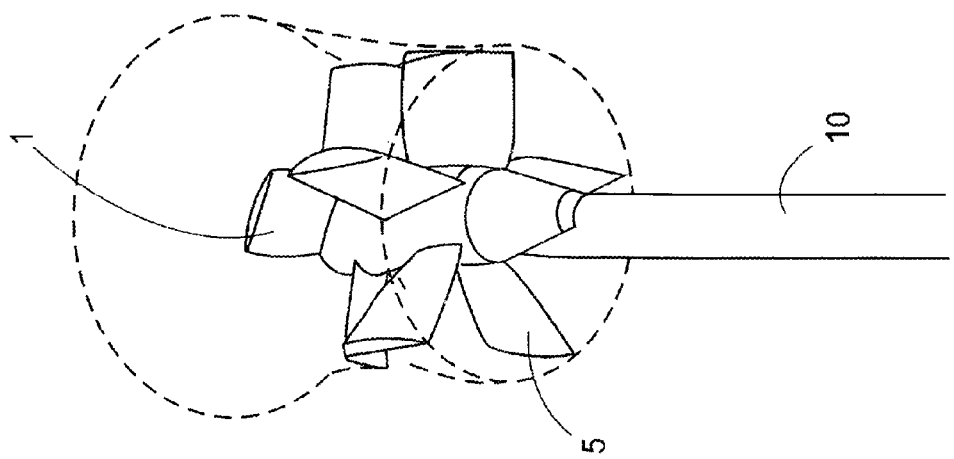
FIG. 3c shows a front view of a turbine according to the third embodiment.

FIGS. 3*a* to 3*c* each show a turbine in accordance with the third embodiment. The structure of the turbine of the third embodiment substantially corresponds to the structure of the turbine of the first and second embodiments. In contrast to the turbines of the first and second embodiments there are five support blades 5 in the guide apparatus.

In the three embodiments shown hereinbefore the blades 1 of the rotor 4 are adapted to be adjustable so that the turbine can be shut down by adjustment of the blades. That means that adjustability of the blades of the guide apparatus is not necessary, for interrupting the flow in the passage.

In the three embodiments shown hereinbefore the rotor is connected to a shaft 10 which in turn can be coupled to an electrical generator in order to convert the rotational movement of the shaft 10 into electrical energy.

The turbine according to the invention is thus an upstream rotor turbine, that is to say the guide apparatus is disposed behind the rotor. The guide apparatus is both the support and the mounting arrangement for the turbine. The blades 1 of the rotor 4 are adapted to be adjustable in an angle of from −20° to 140°. The hub 3 of the rotor 4 is of a substantially spherical configuration so that the blades 1 of the rotor 3 can be set to any desired angle without a gap being present. The flow thus first encounters the rotor 4 before it is further passed into the guide apparatus 6, thus affording optimum flow conditions for the rotor 4. The turbine according to the invention thus has only two levels, that is to say the rotor and the guide apparatus.

The above-described turbine for a hydroelectric power installation is preferably coupled in a transmission-less arrangement (by way of the shaft 10) to a generator for generating electric power, that is to say the arrangement involves a transmission-less system consisting of turbine and generator.

Figure 4:
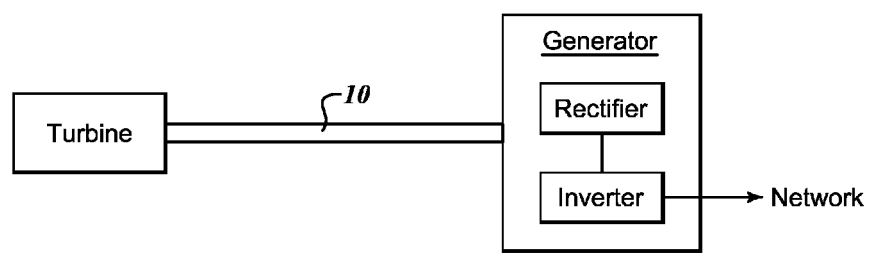
FIG. 4 shows a block diagram of an assembly in which the invention is used.

The generator coupled to the turbine is preferably adapted to be variable in its rotary speed. For that purpose the system or the hydroelectric power installation besides the generator, preferably has a rectifier and an inverter which then in turn can be connected to a network, as shown in New FIG. 4 in which the turbine is coupled by shaft 10 to the generator. By virtue of the provision of the rectifier and the inverter the generator can also be operated at different rotary speeds as the voltage generated by the generator or the power output can be converted to the required network frequency by means of the rectifier and the inverter.

The variable-speed design configuration of the generator makes it possible to achieve a higher output as power generated by the electrical generator can be delivered to the network even when the rotary speed of the generator would not suffice to deliver the frequency required by the network.

If the turbine according to the invention is coupled to an electrical generator and used in a hydroelectric power station, then considerable differences can occur between the headwater (the backed-up part of the water) and the tailwater (a part exposed by a tide movement, beneath a build-up stage). However the power generated by the hydroelectric power station is directly dependent on the difference in height between the headwater and the tailwater. If now a turbine with a fixed-speed generator is used that generator can only be employed when the head of water (difference in height between the headwater and the tailwater) permits a required rotary speed for the generator.

The variable-speed electrical generator according to the invention, with a subsequent inverter, can also be operated at a rotary speed below the required rotary speed, that is to say also at different power output levels. Accordingly the turbine according to the invention can also operate when the rotary speed of the turbine falls below a rotary speed which is otherwise required.

The invention claimed is:

1. A turbine for a hydroelectric power installation for generating electrical energy from water passing over the turbine comprising:
   a rotor having a plurality of turbine blades and having a spherical hub; the turbine blades being connected to the rotor at the spherical hub region; the spherical shape of the hub matching with a shape of the turbine blades at their root where they couple to the rotor hub to ensure that the turbine blades can be set to any desired angle without a gap being present between the root of the turbine blades and the hub to couple the blades to the hub in a positively locking relationship; and
   a guide apparatus having a plurality of support blades which are arranged after the rotor and after the turbine blades of the rotor in the through-flow direction and which serve as a support apparatus of the turbine;
   a means to vary the pitch of the turbine blades of the rotor to alter a rotational speed of the rotor during operation while water is flowing over the turbine blades.

2. A turbine according to claim 1 wherein the pitch angle of the turbine blades adjusts from −20 ° to 140°.

3. A turbine according to claim 1 wherein the turbine is arranged in a passage and the guide apparatus supports the rotor in the passage.

4. A turbine according to claim 1 wherein the plurality of turbine blades is four turbine blades and the plurality of support blades is 7 turbine blades.

5. A hydroelectric power installation having at least one turbine according to claim 1.

6. A hydroelectric power installation according to claim 5 wherein the generator varies in rotary speed in response to a variation in the pitch angle of the turbine blades of the rotor.

7. A hydroelectric power installation according to claim 5 further comprising an electrical generator for generating electrical energy, wherein the electrical generator is transmissionlessly coupled to the turbine.

8. A hydroelectric power installation according to claim 7 further comprising a rectifier for rectifying the electrical output voltage of the generator and an inverter which is coupled to the rectifier and to a network connection, wherein the inverter serves to deliver electrical power from the generator to the network at a frequency which is required by the network.

9. A method of generating electric power from a water flow comprising:

positioning a rotor in a tube within a flow of water;

supporting the rotor in the tube with a plurality of support members extending from the rotor to the tube;

positioning a plurality of turbine blades in the water coupled to the rotor, the location of the turbine blades being up stream from the support members to ensure that water first impacts the turbine blades before impacting the support members;

varying the pitch angle of the turbine blades while water is flowing over them to change the rate of rotation of the rotor for a given flow rate of the water;

blocking water flowing between a root of the turbine blades and the rotor by having a spherical hub of the rotor surface at the location where the turbine blades couple to rotor to prevent a gap from being present between the rotor blades and the hub while the pitch angle is varied.

\* \* \* \* \*